United States Patent
Komuro et al.

(10) Patent No.: US 10,961,370 B2
(45) Date of Patent: Mar. 30, 2021

(54) RESIN COMPOSITION, MELT-MOLDED ARTICLE USING SAME, AND MULTILAYERED STRUCTURE

(71) Applicant: THE NIPPON SYNTHETIC CHEMICAL INDUSTRY CO., LTD., Osaka (JP)

(72) Inventors: Ryohei Komuro, Osaka (JP); Shouichi Kani, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/062,337

(22) PCT Filed: Dec. 13, 2016

(86) PCT No.: PCT/JP2016/087098
§ 371 (c)(1),
(2) Date: Jun. 14, 2018

(87) PCT Pub. No.: WO2017/104673
PCT Pub. Date: Jun. 22, 2017

(65) Prior Publication Data
US 2018/0362728 A1 Dec. 20, 2018

(30) Foreign Application Priority Data
Dec. 16, 2015 (JP) .............................. 2015-245354

(51) Int. Cl.
| | |
|---|---|
| C08K 5/09 | (2006.01) |
| C08K 3/38 | (2006.01) |
| C08K 3/26 | (2006.01) |
| C08L 29/04 | (2006.01) |
| C08K 3/16 | (2006.01) |
| B32B 27/28 | (2006.01) |
| C08K 3/32 | (2006.01) |
| C08K 5/098 | (2006.01) |
| B29B 9/12 | (2006.01) |
| B29B 9/06 | (2006.01) |
| B32B 27/18 | (2006.01) |
| B32B 27/30 | (2006.01) |

(52) U.S. Cl.
CPC .............. C08K 5/09 (2013.01); B29B 9/12 (2013.01); B32B 27/28 (2013.01); C08K 3/16 (2013.01); C08K 3/26 (2013.01); C08K 3/32 (2013.01); C08K 3/38 (2013.01); C08K 5/098 (2013.01); C08L 29/04 (2013.01); B29B 9/06 (2013.01); B32B 27/18 (2013.01); B32B 27/30 (2013.01); B32B 2439/70 (2013.01)

(58) Field of Classification Search
None
See application file for complete search history.

(56) References Cited

U.S. PATENT DOCUMENTS

| | | | |
|---|---|---|---|
| 2011/0135950 | A1 | 6/2011 | Okamoto et al. |
| 2014/0213701 | A1* | 7/2014 | Nonaka ................... C08K 5/09 524/72 |
| 2018/0208750 | A1 | 7/2018 | Komuro et al. |

FOREIGN PATENT DOCUMENTS

| | | |
|---|---|---|
| CN | 107614603 A | 1/2018 |
| JP | S51-132259 A | 11/1976 |
| JP | H-05-262834 | 12/1993 |
| JP | 2003-089741 A | 3/2003 |
| JP | 2009-215399 | 9/2009 |
| JP | 2010-059418 | 3/2010 |
| JP | 2016-121335 | 7/2016 |
| WO | 2016/199827 A1 | 12/2016 |

OTHER PUBLICATIONS

Machine translation of Kesayama JP 5_262834 p. 1-5 (Year: 1993).*
Singapore Office Action dated Jul. 10, 2019 in corresponding Singaporean patent application No. 11201804990W.
EP—Extended European Search Report in No. 16875650.0 dated Jul. 2, 2019.
International Search Report from Patent Application No. PCT/JP2016/087098, dated Feb. 28, 2017.
International Preliminary Report on Patentability from Patent Application No. PCT/JP2016/087098, dated Jun. 19, 2018.
CN Office Action issued in CN App. No. 201680073497.7, dated Jun. 12, 2020, English translation.
JP Office Action issued in JP App. No. 2016-574202, dated Jun. 2, 2020, English translation.
Office Action issued in TW Patent Application No. 105141668 dated Mar. 24, 2020, English translation.
Chinese Office Action, Chinese Patent Office, Application No. 201680073497.7, dated Nov. 30, 2020, English translation.

* cited by examiner

*Primary Examiner* — Robert T Butcher
(74) *Attorney, Agent, or Firm* — Greenblum & Bernstein, P.L.C.

(57) ABSTRACT

The present invention relates to a resin composition containing a saponified ethylene-vinyl ester-based copolymer (A), cinnamic acids (B), and at least either one (C) of an alkali metal salt (C1) and an alkaline earth metal salt (C2) (provided that the component (C) excludes a salt of cinnamic acid), a melt-molded article using the composition, and a multilayer structure.

9 Claims, No Drawings

RESIN COMPOSITION, MELT-MOLDED ARTICLE USING SAME, AND MULTILAYERED STRUCTURE

TECHNICAL FIELD

The present invention relates to a resin composition obtained using a saponified ethylene-vinyl ester-based copolymer (hereinafter, sometimes simply referred to as "EVOH"), a melt-molded article using the same, and a multilayer structure. More specifically, the present invention relates to a resin composition for obtaining a melt-molded article which is excellent in the ultraviolet absorbing effect and alcohol resistance of the ultraviolet absorbing effect while maintaining transparency and is reduced in the odor generation, a melt-molded article using the resin composition, and a multilayer structure including a resin composition layer composed of the resin composition.

BACKGROUND ART

A gas barrier property, particularly, an oxygen barrier property is often required of a packaging material for packing food or various articles. This property is required so as to prevent the packaged contents from the effect of oxygen, etc., such as oxidation degradation, or to maintain the freshness of food for a long time. Accordingly, in the conventional packaging material, a gas barrier layer for preventing permeation of oxygen is provided, and permeation of oxygen etc. is thereby prevented.

The gas barrier layer generally provided in the conventional packaging material includes a gas barrier layer composed of an inorganic substance and a gas barrier layer composed of an organic substance. As the gas barrier layer composed of an inorganic substance, a metal layer such as aluminum foil or aluminum-deposited layer, or a metal compound layer such as silicon oxide-deposited layer or aluminum oxide-deposited layer, is used. However, the metal layer such as aluminum foil or aluminum-deposited layer is disadvantageous in that, for example, the packaged contents are invisible and the disposability is poor. In addition, the metal compound layer such as silicon oxide-deposited layer or aluminum oxide-deposited layer is disadvantageous in that, for example, cracking occurs due to deformation at the time of secondary processing such as printing and lamination, vibration or impact during transportation, deformation or falling of the packaging medium, etc. and the gas barrier property is significantly reduced.

On the other hand, as the gas barrier layer composed of an organic substance, a layer composed of a polyvinylidene chloride-based polymer, or a layer composed of a vinyl alcohol-based polymer such as polyvinyl alcohol and EVOH is used. The polyvinylidene chloride-based polymer may, for example, generate a harmful chlorine compound at the time of incineration disposal and therefore, the use amount thereof is recently decreased. The layer composed of a vinyl alcohol-based polymer such as polyvinyl alcohol and EVOH is transparent and because of its advantage of being relatively resistant to occurrence of cracking in the gas barrier layer and lessening the disposal problem, is widely used for the packaging material.

For example, the packaging material includes a multilayer structure in which a film layer formed by melt-molding of EVOH is used as an intermediate layer and a resin layer composed of a thermoplastic resin is formed as inner and outer layers on both surfaces of the film layer composed of EVOH. Such a multilayer structure is, by taking advantage of its excellent gas barrier property and transparency as described above, utilized by molding it into, for example, a film or sheet as a packaging material such as food packaging material, drug packaging material, industrial chemical packaging material and agrochemical packaging material, or a container such as bottle.

However, the multilayer structure above transmits not only visible light but also ultraviolet ray because of having excellent transparency and may cause a problem that the packaged contents are degraded by ultraviolet ray. In particular, it is known that when the multilayer structure is used as a food packaging material, food as the contents is exposed to an ultraviolet ray of UV-13 and UV-C in the wavelength region of less than 320 nm and consequently, the food itself is significantly changed in quality. Accordingly, there has been proposed a technique of providing excellent transparency and at the same time, preventing light degradation of the contents by incorporating a water-soluble ultraviolet absorber into a film made of a resin such as polyvinyl alcohol, which is a kind of film having gas barrier property (see, for example, Patent Document 1).

RELATED ART

Patent Document

Patent Document 1: JP-A-S51-132259

SUMMARY OF THE INVENTION

Problems that the Invention is to Solve

However, in the technique described in. Patent Document 1, when the film is used as a packaging material for a long period of time, the ultraviolet absorber may bleed out due to the contents, causing a problem such as deterioration of appearance, reduction in the ultraviolet absorbing effect, or generation of odor, and further improvements are demanded.

In addition, when the film is used as the packaging material for alcoholic beverages such as beer, drugs containing an alcohol component, industrial chemicals or agrochemicals, among others, when the film is used as a transparent plastic packaging material, the packaging material is required to have a barrier property to oxygen and carbon dioxide and furthermore, prevent light degradation of the contents. At this time, similarly to the above, the ultraviolet absorber may bleed out due to the contents, causing a problem such as deterioration of appearance, reduction in the ultraviolet absorbing effect, or generation of odor, and further improvements are demanded.

Against such a background, an object of the present invention is to provide a resin composition capable of forming a molded article which absorbs light of a wavelength in a specific ultraviolet region (for example, UV-B or UV-C at a wavelength of less than 320 nm) and in which the ultraviolet absorbing effect is not reduced due to the contents containing an alcohol component and an odor problem, etc. are not caused, a melt-molded article using the composition, and a multilayer structure.

Means for Solving the Problems

As a result of intensive studies in consideration of these circumstances, the present inventors have found that when cinnamic acids (B) and at least either one (C) of an alkali metal salt (C1) and an alkaline earth metal salt (C2) are incorporated into EVOH (A) having excellent gas barrier property and high transparency, light of a wavelength in a specific ultraviolet region can be absorbed while maintaining excellent properties of EVOH (A) and moreover, it is possible to prevent the ultraviolet absorbing effect from decreasing due to the contents containing an alcohol component and suppress the generation of odor. The present invention has been accomplished based on this finding.

<Gist of the Present Invention>

That is, a first gist of the present invention is a resin composition containing EVOH (A), cinnamic acids (B), and at least either one (C) of an alkali metal salt (C1) and an alkaline earth metal salt (C2) (provided that the component (C) excludes a salt of cinnamic acid).

A second gist of the present invention is a melt-molded article obtained by melt-molding the resin composition above, and a third gist is a multilayer structure having at least one resin composition layer composed of the resin composition.

That is, the present invention relates to the following <1> to <6>.

<1> A resin composition comprising the following components (A) to (C):
   a saponified ethylene-vinyl ester-based copolymer (A)
   cinnamic acids (B), and
   at least either one (C) of an alkali metal salt (C1) and an alkaline earth metal salt (C2) (provided that the component (C) excludes a salt of cinnamic acid).

<2> The resin composition according to <1>, wherein a content of the cinnamic acids (B) is from 0.0005 to 0.1 parts by weight per 100 parts by weight of the saponified ethylene-vinyl ester-based copolymer (A).

<3> The resin composition according to <1> or <2>, wherein a content of the at least either one (C) of the alkali metal salt (C1) and the alkaline earth metal salt (C2) is, in terms of metal, from 0.001 to 0.1 parts by weight per 100 parts by weight of the saponified ethylene-vinyl ester-based copolymer (A).

<4> The resin composition according to any one of <1> to <3>, wherein a weight ratio (B/C) of the cinnamic acids (B) and the at least either one (C) of the alkali metal salt (C1) and the alkaline earth metal salt (C2) is from 0.01 to 100.

<5> A melt-molded article obtained by melt-molding the resin composition according to any one of <1> to <4>.

<6> A multilayer structure comprising at least one resin composition layer composed of the resin composition according to any one of <1> to <4>.

Effects of the Invention

According to the present invention, a resin composition capable of forming a molded article which absorbs light of a wavelength in a specific ultraviolet region (for example, UV-B or UV-C at a wavelength of less than 320 nm) and in which the ultraviolet absorbing effect is not reduced due to the contents containing an alcohol component and an odor problem, etc. are not caused, a melt-molded article using the composition, and a multilayer structure can be provided.

MODE FOR CARRYING OUT THE INVENTION

The configurations of the present invention are described below, but these are only an example of preferred embodiments.

The present invention provides a resin composition containing EVOH (A), cinnamic acids (B), and at least either one (C) of an alkali metal salt (C1) and an alkaline earth metal salt (C2) (provided that the component (C) excludes a salt of cinnamic acid). In addition, the present invention provides a melt-molded article obtained by melt-molding the resin composition above and a multilayer structure having at least one resin composition layer composed of the resin composition.

<EVOH (A)>

The EVOH (A) for use in the present invention is described.

The EVOH (A) for use in the present invention is a resin usually obtained by copolymerizing ethylene and a vinyl ester-based monomer and then saponifying the copolymer. The resin is a water-insoluble thermoplastic resin. As to the polymerization method, an arbitrary known polymerization method, for example, solution polymerization, suspension polymerization or emulsion polymerization, may be used, but in general, solution polymerization using methanol as a solvent is used. Saponification of the ethylene-vinyl ester-based copolymer obtained may also be performed by a known method.

That is, the EVOH (A) for use in the present invention principally contains an ethylene structural unit and a vinyl alcohol structural unit and depending on the case, contains a slight amount of a vinyl ester structural unit remaining without being saponified.

As the vinyl ester-based monomer, typically, vinyl acetate is used in view of availability on the market and impurity treatment efficiency at the time of production. Other examples include an aliphatic vinyl ester such as vinyl formate, vinyl propionate, vinyl valerate, vinyl butyrate, vinyl isobutyrate, vinyl pivalate, vinyl caprate, vinyl laurate, vinyl stearate and vinyl versatate, and an aromatic vinyl ester such as vinyl benzoate, and the aliphatic vinyl ester usually has a carbon number of 3 to 20, preferably from 4 to 10, more preferably from 4 to 7. These are usually used individually but, if desired, a plurality of kinds may be used at the same time.

The content of the ethylene structural unit in EVOH (A) is a value measured based on ISO 14663 and is usually from 20 to 60 mol %, preferably from 25 to 50 mol %, more preferably 25 to 35 mol %. If this content is too small, the gas barrier property at high humidity and the melt moldability tend to deteriorate, and conversely, if the content is too large, the gas barrier property tends to be reduced.

The saponification degree of the vinyl ester component in the EVOH (A) is a value measured based on JIS K6726 (in a solution prepared by uniformly dissolving EVOH in a water/methanol solvent) and is usually from 90 to 100 mol %, preferably from 95 to 100 mol %, more preferably from 99 to 100 mol %. If the saponification degree is too low, the gas barrier property, thermal stability, moisture resistance, etc. tend to be reduced.

The melt flow rate (MFR) (210° C., load: 2,160 g) of the EVOH (A) is usually from 0.5 to 100 g/10 min, preferably from 1 to 50 g/10 min, more preferably from 3 to 35 g/10 min. If MFR is too high, the film formability tends to deteriorate. If MFR is too low, melt extrusion is likely to be difficult.

In addition, the EVOH (A) for use in the present invention may further contain a structural unit derived from the following comonomer, to the extent not compromising the effects of the present invention (for example, 10 mol % or less).

The comonomer includes, for example, olefins such as propylene, 1-butene and isobutane, and hydroxy group-containing α-olefins such as 2-propen-1-ol, 3-buten-1-ol, 4-penten-1-ol, 5-hexen-1-ol, 3,4-dihydroxy-1-butene and 5-hexene-1,2-diol, or a derivative thereof such as 3,4-diacyloxy-1-butene, particularly, 3,4-diacetoxy-1-butene, which are an esterified product, 2,3-diacetoxy-1-allyloxypropane, 2-acetoxy-1-allyloxy-3-hydroxypropane, 3-acetoxy-1-allyloxy-2-hydroxypropane, glycerin monovinyl ether and glycerin monoisopropenyl ether, which are an agitated product; hydroxyalkylvinylidenes such as 2-methylenepropane-1,3-diol and 3-methylenepentane-1,5-diol; hydroxyalkylvinylidene diacetates such as 1,3-diacetoxy-2-methylene propane, 1,3-dipropionyloxy-2-methylenepropane and 1,3-dibutylonyloxy-2-methylenepropane; unsaturated acids such as acrylic acid, methacrylic acid, crotonic acid, phthalic acid (anhydride), maleic acid (anhydride) and itaconic acid (anhydride), a salt thereof, or mono- or diallyl esters thereof having a carbon number of 1 to 18; acrylamides such as acrylamide, N-alkylacrylamide having a carbon number of 1 to 18, N,N-dimethylacrylamide, 2-acrylamidopropanesulfonic acid or a salt thereof, and acrylamidopropyldimethylamine or an acid salt thereof, or a quaternary salt thereof; methacrylamides such as methacrylamide, N-alkylmethacrylamide having a carbon number of 1 to 18, N,N-dimethylmethacrylamide, 2-methacrylamidopropanesulfbnic acid or a salt thereof, and methacrylamidopropyldimethylamine, an acid salt thereof, or a quaternary salt thereof; N-vinylainides such as N-vinylpyrrolidone, N-vinylformamide and N-vinylacetamide; vinyl cyanides such as acrylonitrile and methacrylonitrile; vinyl ethers such as alkyl vinyl ether having a carbon number of 1 to 18, hydroxyalkyl vinyl ether and alkoxyalkyl vinyl ether; vinyl halide compounds such as vinyl chloride, vinylidene chloride, vinyl fluoride, vinylidene fluoride and vinyl bromide; vinylsilanes such as trimethoxyvinylsilane; allyl halide compounds such as allyl acetate and allyl chloride; allyl alcohols such as allyl alcohol and dimethoxyallyl alcohol; and a comonomer such as trimethyl-(3-acrylamide-3-dimethylpropyl)-ammonium chloride and acrylamide-2-methylpropanesulfonic acid.

Furthermore, an EVOH (A) subjected to "post-modification" such as urethanation, acetalization, cyanoethylation or oxyalkylenation may also be used.

Above all, an EVOH (A) copolymerized with a hydroxy group-containing α-olefin is preferred, because secondary moldability is improved, and among others, EVOH having a primary hydroxyl group on the side chain, particularly EVOH having 1,2-diol on the side chain, is preferred.

The EVOH (A) having 1,2-diol on the side chain is a copolymer containing a structural unit in the side chain. The 1,2-diol structural unit is specifically a structural unit represented by the following formula (1):

[Chem. 1]

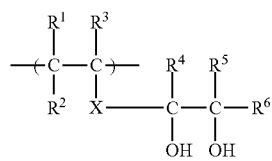

(1)

[in formula (1), each of $R^1$, $R^2$ and $R^3$ independently represents a hydrogen atom or an organic group, X represents a single bond or a binding chain, and each of $R^4$, $R^5$ and $R^6$ independently represents a hydrogen atom or an organic group].

The organic group in the 1,2-diol structural unit represented by formula (1) includes, for example, a saturated hydrocarbon group such as methyl group, ethyl group, n-propyl group, isopropyl group, n-butyl group, isobutyl group and tert-butyl group, an aromatic hydrocarbon group such as phenyl group and benzyl group, a halogen atom, a hydroxyl group, an acyloxy group, an alkoxycarbonyl group, a carboxyl group, and a sulfonic acid group.

In the case where the EVOH (A) contains a 1,2-diol structural unit represented by formula (1), usually, the content thereof is preferably from 0.1 to 20 mol %, more preferably from 0.1 to 15 mol %, still more preferably from 0.1 to 10 mol %.

The EVOH (A) for use in the present invention may be a mixture with other different EVOH, and the other EVOH includes those differing in the content of ethylene structural unit, differing in the content of 1,2-diol structural unit represented by formula (1), differing in the saponification degree, differing in the melt flow rate (MFR), or differing in the other copolymerization component.

<Cinnamic Acids (B)>

In the present invention, cinnamic acids (B) are incorporated into the EVOH (A).

According to the present invention, a resin composition capable of forming a molded article which absorbs light of a wavelength in a specific ultraviolet region (for example, UV-B or UV-C at a wavelength of less than 320 nm) and in which the ultraviolet absorbing effect is not reduced due to the contents containing an alcohol component and an odor problem, etc. are not caused, is obtained.

This is considered to be achieved because cinnamic acids (B), particularly cinnamic acid, in the EVOH (A) partially reacts with at least either one (C) of an alkali metal salt (C1) and an alkaline earth metal salt (C2) to form a salt of cinnamic acid and thereby appropriately reduce the affinity between cinnamic acid and alcohol and consequently, the ultraviolet absorbing effect is prevented from decreasing due to the contents containing an alcohol component.

The cinnamic acids (B) for use in the present invention may include cinnamic acid itself and/or a cinnamic acid derivative such as cinnamyl alcohol, cinnamic acid ester and salt of cinnamic acid, or mixtures thereof. Among these, it is optimal to use cinnamic acid itself.

The cinnamic acid includes, for example, cis-cinnamic acid and trans-cinnamic acid, and in view of stability and cost, trans-cinnamic acid is suitably used.

The salt of cinnamic acid includes, for example, an alkali metal salt of cinnamic acid, such as lithium cinnamate, sodium cinnamate and potassium cinnamate, and an alkaline earth metal salt of cinnamic acid, such as magnesium cinnamate, calcium cinnamate and barium cinnamate, and in view of thermal stability of the resin composition, an alkali metal salt of cinnamic acid is suitably used.

The content of the cinnamic acids (B) is preferably from 0.0005 to 0.1 parts by weight, more preferably from 0.001 to 0.08 parts by weight, still more preferably from 0.0015 to 0.05 parts by weight, yet still more preferably from 0.005 to 0.03 parts by weight, even yet still more preferably from 0.01 to 0.02 parts by weight, per 100 parts by weight of the EVOH (A) If this content is too small, the ultraviolet absorbing effect tends to decrease, whereas if the content is too large, odor generation during melt-molding is likely to arise as a problem.

[Evaluation Method of Content of Cinnamic Acids (B)]

In the present invention, the content of the cinnamic acids (B) in the resin composition can be measured using a liquid chromatography mass spectrometry (LC/MS/MS). For details, the method includes, for example, the following procedure. Incidentally, the following procedure is described taking, as an example, a case of using cinnamic acid as the cinnamic acids (B), but the measurement is performed by the same procedure for the cinnamic acids (B) other than cinnamic acid.

(Preparation of Standard Solution)

Cinnamic acid (10.89 mg) is weighed into a 10 mL measuring flask and dissolved in methanol to make a 10 mL solution (standard stock solution: 1,089 μg/mL). The prepared standard stock solution is then diluted with methanol to prepare respective mixed standard solutions having a plurality of concentrations (0.109 μg/mL, 0.218 μg/mL, 0.545 μg/mL, 1.09 μg/mL, 2.18 μg/mL). Using these mixed standard solutions, LC/MS/MS analysis is conducted, and a calibration curve is created.

(Preparation of Sample Solution)

(1) After weighing the resin composition (1 g) of the present invention into a 10 mL measuring flask, 9 mL of methanol is added thereto.

(2) After conducting an ultrasonic treatment for 120 minutes, the composition is allowed to cool at room temperature (25° C.).

(3) Methanol is added to fix the volume at 10 mL (sample solution (I)).

(4) After collecting 1 mL of the sample solution (I) in a 10 mL measuring flask, methanol is added to fix the volume at 10 mL (sample solution (II)).

(5) A liquid obtained by filtering the sample solution (I) or the sample solution (II) through a polytetrafluoroethylene (PTFE) filter (pore size: 0.45 μm) is subjected as a measurement solution to LC/MS/MS analysis.

(6) A detection concentration of cinnamic acid is calculated from the peak area value detected by LC/MS/MS analysis and the calibration curve of the standard solution.

(LC/MS/MS Measurement Conditions)

LC System: LC-20A [manufactured by Shimadzu Corporation]
Mass spectrometer: API4000 [AB/MDS Sciex]
Analytical column: Scherzo SM-C18 (3.0×75 mm, 3 μm)
Column temperature: 45° C.
Mobile phase: A: An aqueous 10 mmol/L ammonium acetate solution
B: Methanol
Time program: 0.0→45.0 min B %=30%→95%
5.0→10.0 min B %=95%
10.1→15.0 min B %=30%
Flow rate: 0.4 mL/min
Switching valve: 2.0 to 6.0 min: to MS
Injection volume: 5 μL
Ionization: ESI Method
Detection: Negative ion detection (SRM method)
Monitor ion: Q1=147.0→Q3=102.9 (CE: −15 eV)

<At Least Either one (C) of Alkali Metal Salt (C1) and Alkaline Earth Metal Salt C In the present invention, at least either one (C) of an alkali metal salt (C1) and an alkaline earth metal salt (C2) is incorporated into the EVOH (A).

In the present invention, it is considered that cinnamic acids (B), particularly cinnamic acid, in the EVOH (A) partially reacts with at least either one (C) of an alkali metal salt (C1) and an alkaline earth metal salt (C2) to form a salt of cinnamic acid and thereby appropriately reduce the affinity between cinnamic acid and alcohol and consequently, the ultraviolet absorbing effect is prevented from decreasing due to the contents containing an alcohol component.

Accordingly, the at least either one (C) of an alkali metal salt (C1) and an alkaline earth metal salt (C2) may be sufficient if it is a salt capable of forming a salt of cinnamic acid.

The alkali metal salt (C1) and alkaline earth metal salt (C2) for use in the present invention exclude the above-described salt of cinnamic acid and in view of productivity of the resin composition, are preferably a water-soluble salt.

As to the alkali metal salt (C1) and alkaline earth metal salt (C2) for use in the present invention, for example, the alkali metal includes lithium, sodium, potassium, rubidium, cesium, etc., and the alkaline earth metal includes beryllium, magnesium, calcium, barium, strontium, radium, etc. One of these may be used, or two or more thereof may be mixed and used. Among these, for the reason that the thermal stability of the resin composition, the long-run moldability, the interlayer adhesion to an adhesive resin in a laminate formed, the heating stretch moldability, etc. are enhanced, the alkali metal is preferably sodium or potassium, and the alkaline earth metal is preferably magnesium or calcium. In particular, sodium is preferred.

In addition, the alkali metal salt (C1) and alkaline earth metal salt (C2) for use in the present invention may be an inorganic salt such as carbonate, hydrogen carbonate, etc., phosphate, borate, sulfate and chloride, or may be an organic acid salt such as monocarboxylate having a carbon number of 2 to 11 (e.g., acetate, butyrate, propionate, enanthate, caprate), dicarboxylate having a carbon number of 2 to 1.1 (e.g. oxalate, malonate, succinate, adipate, suberate, sebacate), monocarboxylate having a carbon number of 12 or more (e.g. laurate, palmitate, stearate, 12-hydroxystearate, behenate, montanate), and citrate. The salt is preferably an organic acid salt, more preferably a monocarboxylate having a carbon number of 2 to 4, which is a water-soluble low-molecular-weight compound, still more preferably acetate or propionate, and most preferably acetate.

The content of the at least either one (C) of an alkali metal salt (C1) and an alkaline earth metal salt (C2) is, in terms of metal, preferably from 0.001 to 0.1 parts by weight, more preferably from 0.005 to 0.05 parts by weight, still more preferably from 0.008 to 0.025 parts by weight, per 100 parts by weight of the EVOH (A). If this content is too small, the effect of alcohol resistance on the ultraviolet absorbing effect tends to decrease, and if the content is too large, odor generation during melt-molding or poor thermal stability is likely to arise as a problem.

<Evaluation Method of Content of at Least Either One (C) of Alkali Metal Salt (C1) and Alkaline Earth Metal Salt (C2)>

The content of the at least either one (C) of an alkali metal salt (C1) and an alkaline earth metal salt (C2) in the EVOH (A) can be calculated by quantitatively determining each metal by atomic absorption spectroscopy. The sample for atomic absorption analysis can be prepared, for example, as follows: a dried resin composition is accurately weighed, put in a platinum evaporating dish set at a constant weight, carbonized by means of an electric heater, then heated with a gas burner, burned until generating no smoke, furthermore completely ashed by placing the platinum evaporating dish in an electric furnace and raising the temperature, and cooled, and after adding hydrochloric acid and pure water thereto, the ashed product is dissolved by heating with an electric heater, poured into a measuring flask, and made to a constant volume with pure water to obtain a sample for atomic absorption spectrometry.

(Weight Ratio (B/C) of Cinnamic Acids (B) to at Least Either One (C) of Alkali Metal Salt (C1) and Alkaline Earth Metal Salt (C2))

The weight ratio (B/C) between cinnamic acids (B) and at least either one (C) of alkali metal salt (C1) and alkaline earth metal salt (C2) used in the present invention is preferably from 0.01 to 100, more preferably from 0.1 to 50, still more preferably from 0.5 to 10, yet still more preferably from 1 to 5. If this weight ratio (B/C) is too low, the ultraviolet absorbing effect tends to decrease, and if it is too high, the effect of alcohol resistance on the ultraviolet absorbing effect is likely to decrease.

<Other Thermoplastic Resin (D)>

In addition to the EVOH (A), the resin composition of the present invention may contain, as a resin component, other thermoplastic resin (D) in the range of usually 30 wt % or less relative to the EVOH (A).

The other thermoplastic resin (D) includes, for example, a polyolefin-based resin in a broad sense, including an olefin homo- or copolymer such as linear low-density polyethylene, low-density polyethylene, medium-density polyethylene, high-density polyethylene, ethylene-vinyl acetate copolymer, ethylene-propylene copolymer, ethylene-α-olefin (α-olefin having a carbon number of 4 to 20) copolymer, ethylene-acrylic acid ester copolymer, polypropylene, propylene-α-olefin (α-olefin having a carbon number of 4 to 20) copolymer, polybutene and polypentene, a polycyclic olefin, and those obtained by graft-modifying the olefin homo- or copolymer above with unsaturated carboxylic acid or its ester; and a thermoplastic resin such as polystyrene-based resin, polyester, polyamide, copolymerized polyamide, polyvinyl chloride, polyvinylidene chloride, acrylic resin, vinyl ester-based resin, polyester elastomer, polyurethane elastomer, chlorinated polyethylene and chlorinated polypropylene.

Among others, in the case of producing a multilayer structure using the resin composition of the present invention and utilizing it as a food packaging medium, for the purpose of preventing the EVOH (A) layer from dissolving out at the end part of the packaging medium after hot water treatment of the packaging medium, a polyamide-based resin is preferably blended. The polyamide-based resin can form a network structure due to an interaction of an amide bond with an OH group and/or an ester group of the EVOH (A), and elution of EVOH during hot water treatment can thereby be prevented. Accordingly, in the case of using the resin composition of the present invention as a packaging medium of retort food or boiled food, it is preferable to blend a polyamide-based resin.

As the polyamide-based resin, a known resin can be used.

Specifically, the resin includes, for example, a homopolymer such as polycapramide (nylon 6), poly-ω-aminoheptanoic acid (nylon 7), poly-ω-aminononanoic acid (nylon 9), polyundecanamide (nylon 11) and polylauryl lactam (nylon 12).

The copolymerized polyamide-based resin includes an aliphatic polyamide such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryl lactam copolymer (nylon 6/12), caprolactam/ω-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamide/hexamethylene diammonium adipate copolymer (nylon 26/66), caprolactam/hexamethylene diammonium adipate/hexamethylene diammonium sebacate copolymer (nylon 66/610) and ethylene ammonium adipate/hexamethylene diammonium adipate/hexamethylene diammonium sebacate copolymer (nylon 6/66/610); an aromatic polyamide such as polyhexamethylene isophthalamide, polyhexamethylene terephthalamide, polymetaxylylene adipamide, hexamethylene isophthalamide/terephthalamide copolymer, poly-P-phenylene terephthalamide and poly-P-phenylene.3,4'-diphenyl ether terephthalamide; an amorphous polyamide; a modified polyamide obtained by modifying the polyamide-based resin with an aromatic amine such as methylenebenzylamine or metaxylenediamine; a metaxylylene diammonium adipate; etc.

A terminal-modified polyamide-based resin thereof may be used as well, and the polyamide-based resin is preferably a terminal-modified polyamide-based resin. The terminal-modified polyamide-based resin is, specifically, for example, a terminal-modified polyamide-based resin modified with a hydrocarbon group having a carbon number of 1 to 22, and a commercially available product may also be used.

For more detail, a terminal-modified polyamide-based resin in which, for example, the number [X] of terminal COOH groups of the terminal-modified polyamide-based resin and the number [Y] of terminal $CONR^1R^2$ groups (wherein $R^1$ is a hydrocarbon group having a carbon number of 1 to 22 and $R^2$ is a hydrogen atom or a hydrocarbon group having a carbon number of 1 to 22) satisfy:

$$100XY/(X+Y) \geq 5$$

is preferably used.

The above-described terminal-modified polyimide-based resin is a polyamide-based resin obtained by N-substituted amide modification of the carboxyl group of a normal unmodified polyamide-based resin with a terminal modifier and is a resin modified at 5% or more relative to the total number of carboxyl groups contained in the polyamide-based resin before modification. If this modification amount is too small, many carboxyl groups are present in the polyamide-based resin, and it is likely that these carboxyl groups react with EVOH during melt molding to generate a gel, etc. and the obtained film suffers from poor appearance. Such a terminal-modified polyamide-based resin can be produced, for example, by the method described in J-B-H8-19302.

In the case of using a polyamide-based resin as the other thermoplastic resin (D), the content ratio of EVOH/polyamide-based resin is, in terms of weight ratio, usually from 99/1 to 70/30, preferably 97/3 to 75/25, more preferably from 95/5 to 85/15. If the weight ratio of the polyamide-based resin is too large, the long-run moldability and the gas barrier property tend to be reduced, and if the weight ratio of the polyamide-based resin is too small, the effect of suppressing elution of EVOH after hot water treatment is likely to decrease.

<Inorganic Filler (E)>

For the purpose of enhancing the gas barrier property, the resin composition of the present invention may further contain an inorganic filler (E), in addition to EVOH (A) (if desired, other thermoplastic resin (D) as well), cinnamic acids (B) and at least either one (C) of an alkali metal salt (C1) and an alkaline earth metal (C2).

The inorganic filler (E) is preferably a plate-like inorganic filler from the viewpoint of more successfully bringing out the gas barrier property, and examples thereof include kaolin which contains hydrous aluminum silicate as a main component and is a particle in plate-like shape, mica and smectite which are a stratified silicic acid mineral, and talc composed of magnesium hydroxide and silicate. Among these, kaolin is preferably used. The kind of kaolin is not limited, and the kaolin may or may not be calcined, but calcined kaolin is preferred.

The gas barrier property of the resin composition of the present invention is more enhanced by the blending of the inorganic filler (E). In particular, a plate-like inorganic filler has a multilayer structure and therefore, in the case of film molding, the plate-like plane of the plate-like inorganic filler is likely to be oriented in the plane direction of the film. It is presumed that the plate-like inorganic filler thus oriented in the plane direction contributes particularly to the oxygen blocking of the resin composition layer (for example, film).

The content of the inorganic filler (E) is usually from 1 to 20 wt %, preferably from 3 to 18 wt %, more preferably from 5 to 15 wt %, relative to the EVOH (A). If this content is too small, the effect of enhancing the gas barrier property tends to decrease, and if it is too large, the transparency is likely to be reduced.

<Oxygen Absorber (F)>

For the purpose of improving the gas barrier property after hot water treatment (retort treatment), the resin composition of the present invention may further contain an oxygen absorber (F), in addition to EVOH (A), cinnamic acids (B) and at least either one (C) of an alkali metal salt (C1) and an alkaline earth metal (C2).

The oxygen absorber (F) is a compound which traps oxygen faster than the packaged contents. Specifically, the oxygen absorber includes an inorganic oxygen absorber, an organic oxygen absorber, a composite oxygen absorber using an inorganic catalyst (transition metal-based catalyst) and an organic compound, etc. Usually, the oxygen absorber (F) does not contain the at least either one (C) of an alkali metal salt (C1) and an alkaline earth metal (C2).

The inorganic oxygen absorber includes a metal and a metallic compound and absorbs oxygen by the reaction thereof with oxygen.

The metal usually used is a metal (e.g., Fe, Zn, Al, Ni, Sn) having higher ionization tendency than hydrogen and is typically iron. Such a metal is preferably used in a powder form. As the iron powder, all of conventionally known iron powders, irrespective of its production method, etc., such as reduced iron powder, atomized iron powder and electrolytic iron powder, can be used without any particular limitation. In addition, the iron used may be an iron which is once oxidized and then subjected to reduction treatment.

The metal compound is preferably an oxygen-deficient metal compound. The oxygen-deficient metal compound includes cerium oxide ($CeO_2$), titanium oxide ($TiO_2$), zinc oxide (ZnO), etc. Such an oxide is put into an oxygen-deficient state resulting from withdrawal of oxygen from the crystal lattice at the time of reduction treatment and reacts with oxygen in the atmosphere, thereby exerting the oxygen absorbing ability.

It is also preferable for such a metal or metallic compound to contain a halogenated metal, etc. as a reaction accelerator.

The organic oxygen absorber includes, for example, a hydroxyl group-containing compound, a quinone-based compound, a double bond-containing compound, and an oxidizable resin. Oxygen reacts with a hydroxyl group or double bond contained therein, and oxygen can thereby be absorbed. As the organic oxygen absorber, a ring-opened polymer of cycloalkenes, such as polyoctenylene, a conjugated diene polymer such as butadiene, a cyclized product thereof, etc. are preferred.

The content of the oxygen absorber (F) is usually from 1 to 30 wt %, preferably from 3 to 25 wt %, more preferably from 5 to 20 wt %, relative to the EVOH (A).

<Other Additives (G)>

In the resin composition of the present invention, in addition to respective components described above, known additive such as a plasticizer including, for example, an aliphatic polyhydric alcohol such as ethylene glycol, glycerin and hexanediol; higher fatty acid (e.g., lauric acid, myristic acid, palmitic acid, stearic acid, behenic acid, oleic acid), higher fatty acid ester (methyl ester, isopropyl ester, butyl ester, octyl ester, etc. of higher fatty acid), higher fatty acid amide (a saturated aliphatic amide such as stearic acid amide and behenic acid amide, an unsaturated fatty acid amide such as oleic acid amide and erucic acid amide, and a bis fatty acid amide such as ethylene-bis-stearic acid amide, ethylene-bis-oleic acid amide, ethylene-bis-erucic acid amide and ethylene-bis-lauric acid amide), or low-molecular-weight polyolefin (e.g., low-molecular-weight polyethylene or low-molecular-weight polypropylene each having a molecular weight of approximately from 500 to 10,000); a lubricant such as ethylene fluoride resin; an anti-blocking agent; an antioxidant; a colorant; an antistatic agent; an antimicrobial; an insoluble inorganic salt (e.g. hydrotalcite); a surfactant; and a conjugated polyene compound, may be appropriately blended, if desired, within the range not compromising the effects of the present invention (for example, 5 wt % or less of the entire resin composition).

The base resin in the entire resin composition of the present invention is the EVOH (A). Accordingly, the amount of the EVOH (A) is usually 70 wt % or more, preferably 80 wt % or more, more preferably 90 wt % or more, relative to the entire resin composition. If this amount is too large, the effect due to blending of (B), (C), (D), (E), (F), or (G) (including the case of using these in combination) tends to decrease, and if it is too small, the gas barrier property is likely to be reduced.

<Preparation Method of Resin Composition>

The method for preparing the resin composition of the present invention includes, for example, 1) a method where a porous deposit of EVOH (A) having a moisture percentage of 20 to 80 wt % is put into contact with an aqueous dispersion liquid containing cinnamic acids (B) and at least either one (C) of an alkali metal salt (C1) and an alkaline earth metal (C2) to incorporate cinnamic acids (B) and at least either one (C) of an alkali metal salt (C1) and an alkaline earth metal (C2) into the EVOH (A) and then dried, 2) a method where cinnamic acids (B) and at least either one (C) of an alkali metal salt (C1) and an alkaline earth metal (C2) are incorporated into a uniform solution (e.g., water/alcohol solution) of EVOH (A), the solution is extruded in a strand into a coagulating liquid, and the obtained strand is cut into pellets and further subjected to drying treatment, 3) a method where EVOH (A), cinnamic acids (B) and at least either one (C) of an alkali metal salt (C1) and an alkaline earth metal salt (C2) are dry blended en bloc, 4) a method where EVOH (A), cinnamic acids (B) and at least either one (C) of an alkali metal salt (C1) and an alkaline earth metal salt (C2) are dry blended en bloc and then melt-kneaded by an extruder, etc., and 5) a method where at the time of production of the EVOH (A), the alkali (e.g., sodium hydroxide, potassium hydroxide) used in the saponification step is neutralized with acids such as acetic acid, the amount of the remaining acids such as acetic acid or the by-produced alkali metal salt (C1) such as sodium acetate and potassium acetate is adjusted by water washing treatment and after dry blending cinnamic acids (B) and, if desired, an alkaline earth metal salt (C2) with the obtained alkali metal salt (C1)-containing EVOH (A), the blend is melt-kneaded by an extruder, etc.

In order to more markedly obtain the effects of the present invention, the method 1), 2) or 5) is preferred, because the dispersibility of cinnamic acids (B) and at least either one (C) of an alkali metal salt (C1) and an alkaline earth metal salt (C2) is excellent.

In the preparation method of the resin composition obtained by the method 1), 2) or 5) above, after cinnamic acids (B) and at least either one (C) of an alkali metal salt (C1) and an alkaline earth metal salt (C2) are added, drying is performed.

As the method for this drying, various drying methods can be employed. Examples thereof include fluidized drying where a substantially pellet-shaped EVOH is dried while being stirred and dispersed mechanically or by means of hot air, and stationary drying where a substantially pellet-shaped EVOH (A) is dried without applying a dynamic action such as stirring and dispersion. The dryer for performing fluidized drying includes a cylinder-channel type stirring dryer, a round tubular dryer, a rotary dryer, a fluidized-bed dryer, a vibrating fluidized-bed dryer, a conical rotary dryer, etc., and the dryer for performing stationary drying includes a box-type batch dryer which is of a load-stationary type, and a band dryer, a tunnel dryer, a vertical dryer, etc., which are of a load-moving type. It is also possible to perform fluidized drying and stationary drying in combination.

As to the heating gas used at the time of drying treatment, air or an inert gas (e.g. nitrogen gas, helium gas, argon gas) is used. The temperature of the heating gas is preferably from 40 to 150° C. in view of productivity and prevention of thermal deterioration of EVOH (A). The drying treatment time may vary depending on the moisture content or throughput of EVOH (A), but usually, the temperature is preferably on the order of 15 minutes to 72 hours in view of productivity and prevention of thermal deterioration of EVOH (A).

In addition, as the method 4) above, there is, for example, a method of melt-kneading the blend by a single-screw or twin-screw extrusion molding machine, etc. The melt-kneading temperature is usually from 150 to 300° C., preferably from 170 to 250° C.

From the resin composition obtained by the method of 1) to 5) above, a melt-molded article may be obtained directly after melt-kneading the raw materials, but in view of industrial handleability, a melt-molded article is preferably obtained by preparing pellets made of the resin composition after the melt kneading, and subjecting the pellets to a melt-molding process. In view of profitability, a method of melt-kneading the raw materials by using an extruder, extruding the kneaded material in a stand form, and cutting it into pellets is preferred.

The shape of the pellet includes, for example, a spherical shape, a cylindrical shape, a cubic shape, and a rectangular parallelepiped shape, but the pellet is usually spherical (rugby ball-shaped) or columnar. As for the size thereof, in view of convenience at the time of later usage as a molding material, in the case of a spherical pellet, the diameter is usually from 1 to 6 mm, preferably from 2 to 5 mm, and the height is usually from 1 to 6 mm, preferably from 2 to 5 mm. In the case of a columnar pellet, the diameter of the bottom is usually from 1 to 6 mm, preferably from 2 to 5 mm, and the length is usually from 1 to 6 mm, preferably from 2 to 5 mm.

The moisture percentage of the resin composition or pellet is preferably controlled to fall in the range of 0.001 to 5 wt % (furthermore, from 0.01 to 2 wt %, particularly from 0.1 to 1 wt %). If the moisture percentage is too low, the long-run moldability tends to be reduced, and conversely, if it is too high, foaming may disadvantageously occur during extrusion molding.

<Melt-Molded Article>

The melt-molded article of the present invention is obtained by melt-molding the resin composition of the present invention. The resin composition of the present invention can be molded, for example, into a film or furthermore, into a cup, a bottle, etc., by a melt-molding method. The melt-molding method includes an extrusion molding method (e.g., T-die extrusion, inflation extrusion, blow extrusion, melt-spinning, profile extrusion), an injection molding method, etc. The melt-molding temperature is appropriately selected usually from the range of 150 to 300° C.

Incidentally, in the present invention, the "film" is not in particular distinguished from "sheet" and "tape" and is described with a meaning encompassing these.

The melt-molded article containing the resin composition of the present invention may be directly used for various usages. At this time, the thickness of the layer (in the case of preparing a film as a single layer, the film) of the resin composition is usually from 1 to 5,000 μm, preferably from 5 to 4,000 μm, more preferably from 10 to 3,000 μm.

<Multilayer Structure>

The multilayer structure of the present invention has at least one layer composed of the resin composition of the present invention. The layer composed of the resin composition of the present invention (hereinafter, a layer simply referred to as "resin composition layer" indicates the layer composed of the resin composition of the present invention) may be stacked on other base material so as to more increase the strength or impart other functions.

As the base material above, a thermoplastic resin other than EVOH (hereinafter, referred to "other thermoplastic resin (H)") is preferably used.

The layer configuration of the multilayer structure may be, denoting α (α1, α2, . . . ) as the resin composition layer of the present invention and β (β1, β2, . . . ) as the other thermoplastic resin (H) layer, an arbitrary combination such as α/β, β/α/β, α1/α2/β, α/β1/β2, β2/β1/α/β1/β2 and β2/β1/α/β1/α/β1/β2.

In addition, when a recycled layer containing a mixture of the resin composition of the present invention and a thermoplastic resin, obtained by re-melt molding an end part, a defective, etc. generated in the process of producing the multilayer structure, is denoted by R, the layer configuration may also be β/R/α, β/R/α/β, β/R/α/R/β, β/α/R/α/β, β/R/α/R/α/R/β, etc.

The number of layers of the multilayer structure of the present invention is, as a cumulative total, usually from 2 to 15, preferably from 3 to 10.

Incidentally, in the layer configuration above, an adhesive resin layer may be interposed, if desired, between respective layers.

As for the layer configuration of the multilayer construction in the multilayer structure of the present invention, denoting a base unit as a unit of layer structure in which the resin composition layer of the present invention is contained as an intermediate layer and other thermoplastic resin (H) layer is provided as both outside layers of the intermediate layer (β/α/β or β/adhesive resin layer/α/adhesive resin layer/β), a multilayer structure having the base unit as at least a constitutional unit is preferred.

The other thermoplastic resin (H) includes, for example, a polyolefin-based resin in a broad sense, including a polyethylene-based resin such as linear low-density polyethylene, low-density polyethylene, ultra-low-density polyethylene, medium-density polyethylene, high-density polyethylene, ethylene-propylene (block or random) copolymer and ethylene-α-olefin (α-olefin having a carbon number of 4 to 20) copolymer, a polypropylene-based resin such as polypropylene and propylene-α-olefin (α-olefin having a carbon number of 4 to 20) copolymer, an (unmodified) polyolefin-based resin such as polybutene, polypentene and polycyclic olefin-based resin (a polymer having a cyclic olefin structure in the main chain and/or the side chain), and a modified olefin-based resin such as unsaturated carboxylic acid-modified polyolefin-based resin obtained by graft-modifying the polyolefins above with unsaturated carboxylic acid or its ester, an ionomer, an ethylene-vinyl acetate copolymer, an ethylene-acrylic acid copolymer, an ethylene-acrylic acid ester copolymer, a polyester-based resin, a polyamide-based resin (including copolymerized polyamide), polyvinyl chloride, polyvinylidene chloride, an acrylic resin, a polystyrene-based resin, a vinyl ester-based resin, a polyester elastomer, a polyurethane elastomer, a halogenated polyolefin such as chlorinated polyethylene and chlorinated polypropylene, and aromatic or aliphatic polyketones.

Among these, in consideration of hydrophobicity, a polyamide-based resin, a polyolefin-based resin, a polyester-based resin, and a polystyrene-based resin, which are a hydrophobic resin, are preferred, a polyolefin-based resin such as polyethylene-based resin, polypropylene-based resin, polycyclic olefin-based resin and their unsaturated carboxylic acid-modified polyolefin-based resin, is more preferred, and in particular, a polycyclic olefin-based resin is preferably used as the hydrophobic resin.

As the adhesive resin that is a material for forming the adhesive resin layer above, a known adhesive resin can be used, and the adhesive resin may be appropriately selected according to the kind of the thermoplastic resin used for the other thermoplastic resin (H) working out to a base material.

Typically, the adhesive resin includes a carboxyl group-containing modified polyolefin-based polymer obtained by chemically bonding an unsaturated carboxylic acid or an anhydride thereof to a polyolefin-based resin by addition reaction, graft reaction, etc.

Examples thereof include a maleic anhydride graft-modified polyethylene, a maleic anhydride graft-modified polypropylene, a maleic anhydride graft-modified ethylene-propylene (block or random) copolymer, a maleic anhydride graft-modified ethylene-ethyl acrylate copolymer, a maleic anhydride graft-modified ethylene-vinyl acetate copolymer, a maleic anhydride-modified polycyclic olefin-based resin, and a maleic anhydride graft-modified polyolefin-based resin. One of these may be used alone, or two or more thereof may be used in combination.

The other thermoplastic resin (H) (base material resin) and adhesive resin layer may contain conventionally known plasticizer, filler, clay (e.g., montmorillonite), colorant, antioxidant, antistatic agent, lubricant, nucleating agent, antiblocking agent, ultraviolet absorber, wax, etc. within the range not compromising the purpose of the present invention (for example, 30 wt % or less, preferably 10 wt % or less)

In the case of manufacturing a multilayer structure by stacking the resin composition of the present invention on other base material (other thermoplastic resin (H)) (including the case of interposing an adhesive resin layer), the stacking may be performed by a known method.

The method includes, for example, a method of melt-extrusion laminating other base material to a film, a sheet, etc. of the resin composition of the present invention, a method of, conversely, melt-extrusion laminating the resin composition of the present invention to other base material, a method of co-extruding the resin composition of the present invention and other base material, a method of preparing each of a film (layer) composed of the resin composition of the present invention and other base material (layer) and dry laminating these by use of a known adhesive such as organic titanium compound, isocyanate compound, polyester-based compound or polyurethane compound, and a method of applying a solution of the resin composition of the present invention onto other base material and removing the solvent. Among these, in view of cost and environment, a method of co-extruding the layers is preferred.

The multilayer structure is then subjected to (heating) stretching treatment, if desired. The stretching treatment may be either uniaxial stretching or biaxial stretching, and in the case of biaxial stretching, the stretching may be either simultaneous stretching or sequential stretching. As the stretching method, out of a roll stretching method, a tenter stretching method, a tubular stretching method, a stretch blowing method, a vacuum air-pressure molding, etc., a method capable of achieving a high stretch ratio may be employed. The stretching temperature is selected from the range of usually from 40 to 170° C., preferably on the order of 60 to 160° C. If the stretching temperature is too low, the stretchability is poor, and if it is too high, stable stretched state can hardly be maintained.

In this regard, for the purpose of imparting dimensional stability after stretching, heat setting may be subsequently performed. Heat setting can be conducted by a well-known method and, for example, the stretched multilayer structure (stretched film) is heat-treated usually at 80 to 180° C., preferably at 100 to 165° C., for usually from 2 to 600 seconds while maintaining a tension state.

In the case where the multilayer stretched film obtained using the resin composition of the present invention is used as a shrinking film, in order to impart thermal shrinkability, for example, the film after stretching may be subjected to a treatment such as cool setting by applying cold air to the film after stretching without performing the above-described heat setting.

Furthermore, depending on the case, a cup- or tray-shaped multilayer container can also be obtained from the multilayer structure of the present invention. As the manufacturing method of the multilayer container, a draw molding method is usually employed, and specifically, the method includes a vacuum molding method, a compression molding method, a vacuum air-pressure molding method, a plug-assisted vacuum air-pressure molding method, etc. In the case of obtaining a tube- or bottle-shaped multilayer container from a multilayer parison (a hollow tubular preform before blowing), a blow molding method is employed. Specifically, the method includes an extrusion blow molding method (e.g., double-head type, mold shift type, parison shift type, rotary type, accumulator type, horizontal parison type), a cold parison blow molding method, an injection blow molding method, a biaxial stretch blow molding method (e.g., extrusion cold parison biaxial stretch blow molding method, injection cold parison biaxial stretch blow molding method, injection-forming in-line biaxial stretch blow molding method), etc.

The multilayer structure of the present invention may be subjected to, if desired, heat treatment, cooling treatment, rolling treatment, printing, dry lamination, solution or melt coating, bag-making, deep drawing, box-making, tube formation, splitting, etc.

The thickness of the multilayer structure (including the stretched multilayer structure) of the present invention and furthermore, the thicknesses of the resin composition layer, other thermoplastic resin (H) layer and adhesive resin layer constituting the multilayer structure are appropriately set according to the layer configuration, the kind of thermoplastic resin, the kind of adhesive resin, the usage, the package form, the required physical properties, etc. Incidentally, in the case where at least one layer out of the resin composition layer, adhesive resin layer and other thermoplastic resin (H) layer is formed in two or more layers, the numerical value in the following is a value obtained by summing the thicknesses of layers of the same type.

The total thickness of the multilayer structure (including the stretched multilayer structure) of the present invention is usually from 10 to 5,000 μm, preferably from 30 to 3,000 μm, more preferably from 50 to 2,000 μm. If the total thickness of the multilayer structure is too small, the gas barrier property may decrease. If the total thickness of the multilayer structure is too large, the gas barrier property becomes an over-performance and since unnecessary raw materials are used, this tends to be unprofitable.

The resin composition layer is usually from 1 to 500 μm, preferably from 3 to 300 μm, more preferably from 5 to 200 μm, the other thermoplastic resin (H) layer is usually from 5 to 30,000 μm, preferably from 10 to 20,000 μm, more preferably from 20 to 10,000 μm, and the adhesive resin layer is usually from 0.5 to 250 μm, preferably from 1 to 150 μm, more preferably from 3 to 100 μm.

Furthermore, the ratio in thickness between the resin composition layer and the other thermoplastic resin (H) layer (resin composition layer/other thermoplastic resin (H) layer) in the multilayer structure is, in the case where each layer is formed in a plurality of layers, the ratio between layers having a largest thickness is, usually from 1/99 to 50/50, preferably from 5/95 to 45/55, more preferably from 10/90 to 40/60. In addition, the ratio in thickness between the resin composition layer and the adhesive resin layer (resin composition layer/adhesive resin layer) in the multilayer structure is, in the case where each layer is formed in a plurality of layers, the ratio between layers having a largest thickness is, usually from 10/90 to 99/1, preferably from 20/80 to 95/5, more preferably from 50/50 to 90/10.

A container or cover member such as bag, cup, tray, tube or bottle made of the thus-obtained film or stretched film is useful as various packaging materials or containers for general foods and also for seasonings such as mayonnaise and dressings, fermented foods such as miso paste, fats and oils such as salad oil, beverages, cosmetics, and medicines.

Among others, the layer composed of the resin composition of the present invention has excellent absorption performance for light of a wavelength in a specific ultraviolet region (for example, UV-B or UV-C at a wavelength of less than 320 nm) as well as high transparency and does not cause reduction in the ultraviolet absorbing effect due to the contents containing an alcohol component, an odor problem, etc. and therefore, the container is useful as various containers for general foods, seasonings such as mayonnaise and dressings, fermented foods such as miso paste, fats and oils such as salad oil, soups, beverages, cosmetics, medicines, detergents, fragrances, industrial chemicals, agrochemicals, fuels, etc.

In particular, the packaging material is useful as a packaging material of, for example, a bottle-shaped container or tube-shaped container for semi-solid foods and seasonings such as mayonnaise, ketchup, sauce, miso paste, wasabi, mustard and sauce for broiled meat, etc. and for liquid beverages and seasonings such as salad oil, mirin, juice, tea, sports drinks, mineral water and milk, a cup-shaped container for semi-solid foods and seasonings such as fruit, jelly, pudding, yogurt, mayonnaise, miso, processed rice, cooked food and soup, and a wide-mouth container for raw meat, processed meat product (e.g., ham, bacon, Vienna sausage), cooked rice and pet food and furthermore, is suitably useful as a material of a container for alcoholic beverages such as refined sake, beer and wine, and of a tank for alcohol fuel (e.g., biofuel).

EXAMPLES

The present invention is described more specifically below by referring to Examples, but the present invention is not limited to the following Examples as long as the gist thereof is observed. Incidentally, the "parts" in Examples is on the weight basis.

Example 1

<Production of Resin Composition and Single-Layer Film>

As the EVOH (A), EVOH (a1) [content of ethylene structural unit: 29 mol %, saponification degree: 99.6 mol %, MFR: 8.8 g/10 min (210° C., load: 2,160 g) was used. Pellet-like EVOH (a1) was immersed in an aqueous solution containing sodium acetate (c1) and dried to obtain an alkali metal salt-containing EVOH resin containing 110 ppm, in terms of sodium, of sodium acetate (c1), in which the moisture percentage of the resin composition pellet was finally 0.2 wt % relative to the resin composition. That is, this resin contains 0.011 parts, in terms of sodium, of sodium acetate (c1) per 100 parts of EVOH (a1).

Here, the content of sodium acetate (c1) was calculated by ashing the alkali metal salt-containing EVOH resin, dissolving it in an aqueous hydrochloric acid solution, and quantitatively determining sodium by atomic absorption spectroscopy.

As the cinnamic acids (B), cinnamic acid (b1) produced by Wako Pure Chemical Industries, Ltd. was used. Cinnamic acid (b1) was combined with the alkali metal salt-containing EVOH resin produced by the procedure above, to account for 0.0155 parts per 100 parts of EVOH (a1) in the resin and dry blended. The resulting blend was melt-kneaded for 5 minutes under the conditions of 230° C. and 50 rpm by using Plastgraph manufactured by Brabender to prepare a resin composition.

The obtained resin composition was subjected to hot press molding at 230° C. by using a compression molding machine (NSF-37) manufactured by SHINTO Metal Industries Corporation to produce a single-layer film having a thickness of 80 μm, a width of 1.5 cm, and a length of 5 cm.

The following evaluations (ultraviolet absorbing effect, odor sensory test) of the obtained single-layer film were performed.

Incidentally, the content of cinnamic acid (b1) was evaluated based on the following procedure by using a liquid chromatography mass spectrometry (LC/MS/MS).

(Preparation of Standard Solution)

Cinnamic acid (b1) (10.89 mg) was weighed into a 10 mL measuring flask and dissolved in methanol to make a 10 mL solution (standard stock solution: 1,089 μg/mL). The prepared standard stock solution was then diluted with methanol to prepare respective mixed standard solutions having a plurality of concentrations (0.109 μg/mL, 0.218 μg/mL, 0.545 μg/mL, 1.09 μg/mL, and 2.18 μg/mL). Using these mixed standard solutions, LC/MS/MS analysis was conducted, and a calibration curve was created.

(Preparation of Sample Solution)

(1) After weighing the resin composition (1 g) obtained above into a 10 mL measuring flask, 9 mL of methanol was added thereto.

(2) After conducting an ultrasonic treatment for 120 minutes, the composition was allowed to cool at room temperature (25° C.).

(3) Methanol was added to fix the volume at 10 mL (sample solution (I)).

(4) After collecting 1 mL of the sample solution (1) in a 10 mL measuring flask, methanol was added to fix the volume at 10 mL (sample solution (II)).

(5) A liquid obtained by filtering the sample solution (I) or the sample solution (II) through a PTFE filter (pore size: 0.45 μm) was subjected as a measurement solution to LC/MS/MS analysis.

(6) A detection concentration of cinnamic acid (b1) was calculated from the peak area value detected by LC/MS/MS analysis and the calibration curve of the standard solution.

(LC/MS/MS Measurement Conditions)

LC System: LC-20A [manufactured by Shimadzu Corporation]

Mass spectrometer: API4000 [AB/MDS Sciex]

Analytical column: Scherzo SM-C18 (3.0×75 mm, 3 μm)

Column temperature: 45° C.

Mobile phase: A: An aqueous 10 mmol/L ammonium acetate solution

B: Methanol

Time program: 0.0→5.0 min B %30%→95%

5.0→10.0 min B %=95%

10.1→15.0 min B %=30%

Flow rate: 0.4 mL/min

Switching valve: 2.0 to 6.0 min: to MS

Injection volume: 5 μL

Ionization: ESI Method

Detection: Negative ion detection (SRM method)

Monitor ion: Q1=147.0→Q3=102.9 (CE: −15 eV)

<Evaluation of Ultraviolet Absorbing Effect>

The transmittance (%) at a wavelength of 280 nm (ultraviolet region) of the single-layer film above was measured using a spectrophotometer "UV2600" manufactured by Shimadzu Corporation. In addition, an EVOH (A) single-layer film was prepared as a base film by the same procedure as in Comparative Example 1 later and measured for the transmittance (%) in the same manner.

Thereafter, the ultraviolet absorption increasing rate (Z) was calculated using the following formula (1), and the ultraviolet absorbing effect was evaluated according to the following evaluation criteria:

Ultraviolet absorption increasing rate (Z)≥2: A

Ultraviolet absorption increasing rate (Z)<2: B

[Math. 1]

$$\text{Ultraviolet absorption increasing rate }(Z) = \text{Ultraviolet transmittance of base film/Ultraviolet transmittance of single-layer film of Example 1} \quad (1)$$

<Evaluation of Alcohol Resistance of Ultraviolet Absorbing Effect>

Each of the single-layer film and base film above was put in a closed flask containing 50 ml of ethanol (purity: from 95.1 to 96.9%) produced by Yamazen Pharmaceutical Co., Ltd. and after stirring at room temperature for 3 days, the single-layer film and the base film were measured for transmittance % at a wavelength of 280 nm (ultraviolet region) by using a spectrophotometer "UV2600" manufactured by Shimadzu Corporation.

Then, the ultraviolet absorption increasing rate (Z) was calculated using formula (1), and the alcohol resistance of the ultraviolet absorbing effect was evaluated according to the following criteria:

Ultraviolet absorption increasing rate (Z)≥2: A

Ultraviolet absorption increasing rate (Z)<2: B

<Odor Sensory Test (Odor Evaluation)>

A sample obtained by sealing 5 g of the single-layer film above in a flask with stopper and leaving it to stand at 200° C. for 15 minutes in a nitrogen atmosphere was subjected to an odor sensory test. Incidentally, seven persons attended the odor sensory test and gave scores based on the following evaluation criteria, and an average value of seven persons was employed as the odor evaluation result. A higher numerical value indicates that the odor is stronger, and in particular, scores of 4 or more mean malodor.

0: Odorless

1: Scarcely perceivable odor

2: Identifiable weak odor

3: Easily perceivable odor

4: Strong odor (malodor)

5: Intense odor (intense malodor)

Comparative Example 1

A resin composition and a single-layer film were produced in the same manner as in Example 1 except that cinnamic acid (b1) and sodium acetate (c1) were not blended. The obtained single-layer film was evaluated in the same manner as in Example 1.

Comparative Example 2

A resin composition and a single-layer film were produced in the same manner as in Example 1 except that sodium acetate (c1) was not blended. The obtained single-layer film was evaluated in the same manner as in Example 1.

Comparative Example 3

A resin composition and a single-layer film were produced in the same manner as in Example 1 except that cinnamic acid (b1) was not blended. The obtained single-layer film was evaluated in the same manner as in Example 1.

The results of evaluations above are shown in Table 1 below together with the components constituting each of the obtained resin compositions and single-layer films and the ratio thereof.

TABLE 1

| | Example 1 | Comparative Example 1 (base film) | Comparative Example 2 | Comparative Example 3 |
|---|---|---|---|---|
| EVOH (a1) "parts" | 100 | 100 | 100 | 100 |
| Cinnamic acid (b1) "parts" | 0.0155 | 0 | 0.0155 | 0 |
| Sodium acetate (c1) "parts" (in terms of sodium) | 0.011 | 0 | 0 | 0.011 |
| B/C | 1.4 | — | — | 0 |
| Ultraviolet transmittance "%" (280 nm) | 9.5 | 24.1 | 10.7 | 20 |
| Ultraviolet absorption increasing rate (Z) (before immersion in alcohol) | 2.5: A | 1 | 2.3: A | 1.2: B |
| Ultraviolet absorption increasing rate (Z) (after immersion in alcohol) | 2.2: A | 1 | 1.6: B | 1.2: B |
| Odor evaluation (200° C., 15 minutes) | 3 | 2.6 | 2.9 | 2.7 |

It is seen from the results above that in the single-layer film of Example 1 obtained by incorporating cinnamic acid (b1) and sodium acetate (c1) into EVOH (a1), the ultraviolet (280 nm) absorbing effect is high, the alcohol resistance of the ultraviolet absorbing effect is strong, the odor evaluation is less than 4, and thus odor generation at a high temperature (e.g., at the time of melt molding) is suppressed, compared with the single-layer films of Comparative Examples 1 to 3 not containing a part thereof.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2015-245354) filed on Dec. 16, 2015, the contents of which are incorporated herein by way of reference.

INDUSTRIAL APPLICABILITY

The resin composition of the present invention contains EVOH (A), cinnamic acids (B), and at least either one (C) of an alkali metal salt (C1) and an alkaline earth metal salt (C2). In addition, the melt-molded article (e.g., film) and the multilayer structure composed of the resin composition provide an excellent film which absorbs light of a wavelength in a specific ultraviolet region (for example, UV-B or UV-C at a wavelength of less than 320 nm) while maintaining excellent transparency and furthermore, in which generation of odor is suppressed. Accordingly, these are useful as various packaging materials for food, particularly, as a container for alcoholic beverages.

The invention claimed is:

1. A resin composition comprising the following components (A) to (C):
   a saponified ethylene-vinyl ester-based copolymer (A)
   cinnamic acid (B), and
   at least either one (C) of
      an alkali metal salt (C1) and
      an alkaline earth metal salt (C2)
   wherein the component (C) excludes a salt of cinnamic acid;
   wherein a content of the at least either one (C) of the alkali metal salt (C1) and the alkaline earth metal salt (C2) is, in terms of metal, from 0.001 to 0.05 parts by weight per 100 parts by weight of the saponified ethylene-vinyl ester-based copolymer (A);
   wherein cinnamic acid (B) is at least one selected from the group consisting of cinnamic acid itself and a salt of cinnamic acid; and
   wherein the saponification degree of the vinyl ester component in the ethylene-vinyl ester-based copolymer (A) is from 90 to 100 mol %.

2. The resin composition according to claim 1,
   wherein a content of the cinnamic acid (B) is from 0.0005 to 0.1 parts by weight per 100 parts by weight of the saponified ethylene-vinyl ester-based copolymer (A).

3. The resin composition according to claim 1,
   wherein a weight ratio (B/C) of the cinnamic acid (B) and the at least either one (C) of the alkali metal salt (C1) and the alkaline earth metal salt (C2) is from 0.01 to 100.

4. A melt-molded article obtained by melt-molding the resin composition according to claim 1.

5. A multilayer structure comprising at least one resin composition layer composed of the resin composition according to claim 1.

6. A resin composition comprising the following components (A) to (C):
   a saponified ethylene-vinyl ester-based copolymer (A)
   cinnamic acid (B), and
   at least either one (C) of
      an alkali metal salt (C1) and
      an alkaline earth metal salt (C2)
   wherein the component (C) excludes a salt of cinnamic acid;
   wherein a content of the at least either one (C) of the alkali metal salt (C1) and the alkaline earth metal salt (C2) is, in terms of metal, from 0.001 to 0.05 parts by weight per 100 parts by weight of the saponified ethylene-vinyl ester-based copolymer (A);
   wherein cinnamic acid (B) is at least one selected from the group consisting of cinnamic acid itself and a salt of cinnamic acid;
   wherein the saponification degree of the vinyl ester component in the ethylene-vinyl ester-based copolymer (A) is from 90 to 100 mol %; and
   wherein a content of the cinnamic acid (B) is from 0.0005 to 0.1 parts by weight per 100 parts by weight of the saponified ethylene-vinyl ester-based copolymer (A).

7. The resin composition according to claim 6,
   wherein a weight ratio (B/C) of the cinnamic acid (B) and the at least either one (C) of the alkali metal salt (C1) and the alkaline earth metal salt (C2) is from 0.01 to 100.

8. A melt-molded article obtained by melt-molding the resin composition according to claim 6.

9. A multilayer structure comprising at least one resin composition layer composed of the resin composition according to claim 6.

* * * * *